United States Patent
Sakamoto et al.

[11] Patent Number: 5,879,485
[45] Date of Patent: Mar. 9, 1999

[54] PNEUMATIC RADIAL TIRE INCLUDING RUBBER SPACER BETWEEN AXIALLY ADJACENT CARCASS CORDS

[75] Inventors: Masayuki Sakamoto; Yutaka Kuroda, both of Shirakawa; Katsuhito Miura, Akashi, all of Japan

[73] Assignee: Sumitomo Rubber Industries, Kobe, Japan

[21] Appl. No.: 788,168

[22] Filed: Jan. 24, 1997

Related U.S. Application Data

[62] Division of Ser. No. 285,142, Aug. 3, 1994, Pat. No. 5,639,321.

[30] Foreign Application Priority Data

Aug. 10, 1993 [JP] Japan ..................................... 5-219123
Jun. 27, 1994 [JP] Japan ..................................... 6-168832

[51] Int. Cl.$^6$ .............................. B60C 9/02; B60C 9/08; B60C 13/00; B60C 15/00; B60C 19/00
[52] U.S. Cl. ..................... 152/554; 152/548; 152/555; 152/564
[58] Field of Search .................. 152/454, 458, 152/531, 532, 546–550, 553–556, 560, 564

[56] References Cited

U.S. PATENT DOCUMENTS

| | | | |
|---|---|---|---|
| 3,052,275 | 9/1962 | Hylbert, Jr. .......................... | 152/549 X |
| 3,292,681 | 12/1966 | Travers ................................ | 152/555 X |
| 3,542,108 | 11/1970 | Rye et al. ............................. | 152/549 |
| 3,682,217 | 8/1972 | Marzocchi ........................... | 152/532 X |
| 3,717,190 | 2/1973 | Boileau ................................ | 152/555 X |
| 3,916,968 | 11/1975 | Masson ................................ | 152/549 X |
| 4,086,948 | 5/1978 | Suzuki et al. ........................ | 152/564 X |
| 4,770,222 | 9/1988 | Mezzanotte . | |
| 5,361,820 | 11/1994 | Adachi .................................. | 152/555 |

FOREIGN PATENT DOCUMENTS

| | | | |
|---|---|---|---|
| 54-136003 | 10/1979 | Japan ..................................... | 152/549 |
| 3204313 | 9/1991 | Japan ..................................... | 152/549 |
| 6122302 | 5/1994 | Japan ..................................... | 152/549 |
| 6127211 | 5/1994 | Japan ..................................... | 152/549 |
| 3005543 | 8/1980 | United Kingdom . | |
| 2096949 | 10/1982 | United Kingdom . | |

OTHER PUBLICATIONS

Mechanics of Pneumatic Tires, Ed. Samuel Clark: U.S. Dept. of Transportation, p. 881 (Aug. 1981).

*Primary Examiner*—Adrienne Johnstone

[57] ABSTRACT

A pneumatic radial tire comprising a tread portion, a pair of sidewall portions, a pair of bead portions each with a bead core therein, a carcass extending between the bead portions, a belt disposed radially outside the carcass and having a pair of edges, a rubber bead apex disposed in each bead portion and extending radially outwardly from the bead core, portions of the carcass one between each edge of the belt and the maximum tire width position are each provided therein with a rubber spacer disposed between axially adjacent carcass cords so that the cord spacing between the axially adjacent cords is in the range of from 0.55 to 5.5 times the diameter of the cords, whereby steering performance is improved without increasing the tire weight.

3 Claims, 11 Drawing Sheets

PNEUMATIC RADIAL TIRE INCLUDING RUBBER SPACER BETWEEN AXIALLY ADJACENT CARCASS CORDS

This application is a divisional of application Ser. No. 08/285,142, filed on Aug. 3, 1994, now U.S. Pat. No. 5,639,321, the entire contents of which are hereby incorporated by reference.

BACKGROUND OF THE INVENTION

The present invention relates to a pneumatic radial tire having an improved carcass structure, in which steering performances are improved without increasing the tire weight.

FIELD OF THE INVENTION

In general, a pneumatic radial tire, especially a passenger radial tire is provided with a carcass made of one or two plies of radially arranged cords.

In the case of one carcass ply, usually, the ply is turned up around bead cores from the inside to outside of the tire to be secured thereto.

In case of two carcass plies, 1) both of them are turned up around bead cores, or 2) one of them is turned up around bead cores and the other is turned down around bead cores from the axially outside.

In either case, by making a bead apex outof high-rigidity rubber and increasing the carcass ply turnup height, the tire sidewall portions are provided with rigidity so as to increase the lateral stiffness of the tire and to obtain the desired steering performance. The steering performance is however, a contradictory requirement to tire weight reduction.

In order to improve steering performances, if, as usual, the carcass ply number and the turnup heights thereof are increased, and/or the bead apex height is increased, the tire weight inevitably increases. To reduce the tire weight by decreasing the carcass ply turnup height and/or bead apex the steering performances are correspondingly deteriorated. Thus, it is very difficult to satisfy both of the requirements in a tire, whereas recent improvements in vehicle performance and fuel consumption greatly require a light weight tire.

SUMMARY OF THE INVENTION

It is therefore, an object of the present invention to provide a pneumatic radial tire in which steering performances are improved, without increasing the tire weight.

According to one aspect of the the present invention, a pneumatic radial tire comprises
a tread portion,
a pair of sidewall portions,
a pair of bead portions, each with a bead core therein and a bead apex extending radially outwardly from the the bead core,
a carcass extending between the bead portions,
a belt disposed radially outside of the carcass and having a pair of edges,
the carcass being provided on each side of the tire equator between axially adjacent carcass cords with a rubber spacer so that the cord distance between said axially adjacent carcass cords is in the range of from 0.55 to 5.5 times the diameter of the carcass cords, and
the rubber spacer extending between the belt edge and the maximum width position of the tire.

The region (Y) between the axially outer edge (7e) of the belt and the maximum tire width position (P) is subjected to a large bending deformation during running. By increasing the rigidity of this region, the bending deformation is controlled, and steering performances can be effectively improved.

In general, a bending stress neutral line (X) in the above-mentioned region lies within the thickness of the carcass as shown in FIG. 6. Accordingly, in a conventional carcass structure in which carcass cord plies A and B abut each other directly, resistance against the bending stress is mainly provided by the bending rigidity of the cords.

In the present invention, as the rubber spacer is disposed in the carcass, the carcass cords are located at a distance from a bending stress neutral line X as shown in FIG. 7.

As a result, when deformed, the outer carcass cords are subjected to a tensile stress and the inner carcass cords are subjected to a compressive stress.

Therefore, the carcass rigidity against bending deformation is effectively increased to improve the steering performances, without increasing the tire weight.

BRIEF DESCRIPTION OF THE DRAWINGS

The present invention will now be described in detail in conjunction with the drawings, wherein.

DETAILED DESCRIPTION OF THE INVENTION

Figure 1:
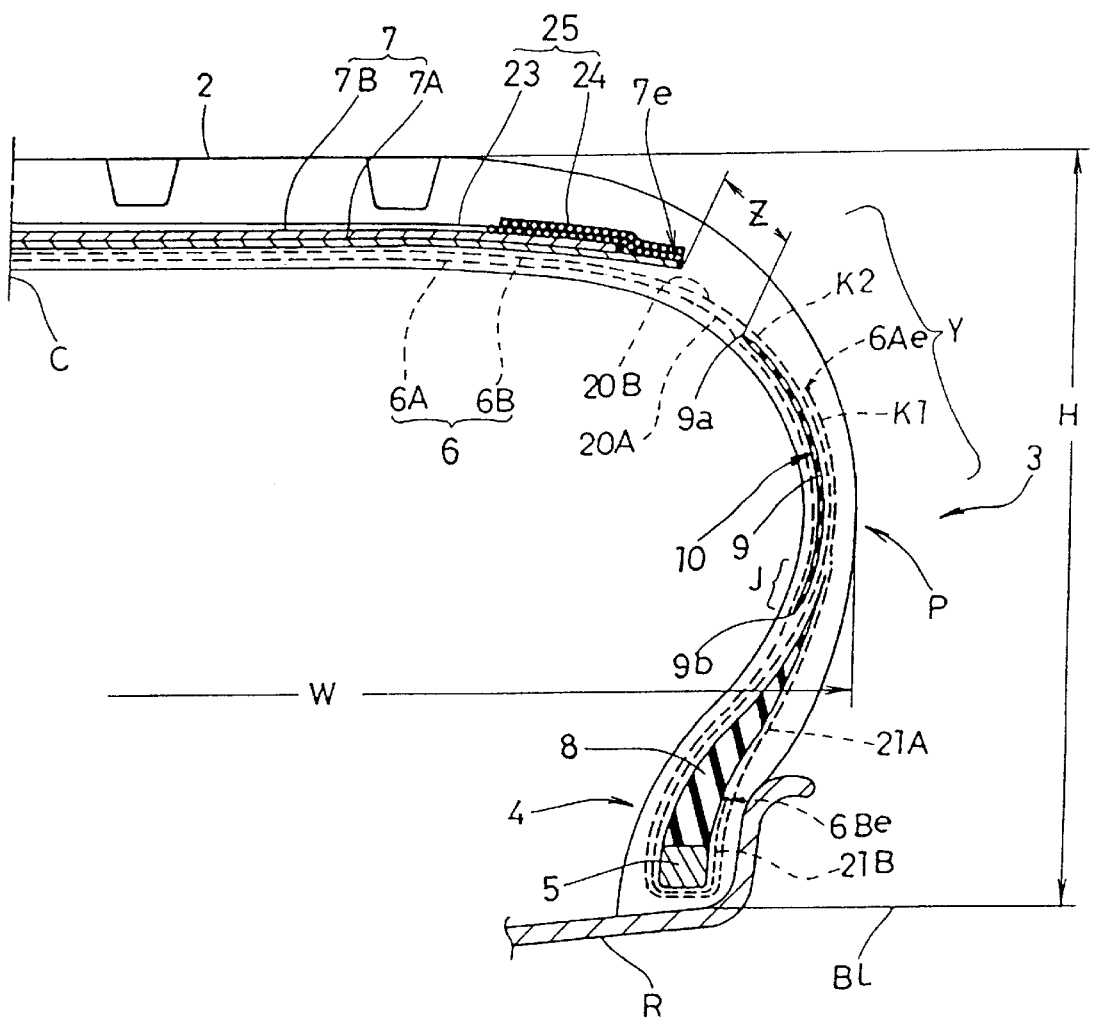
FIG. 1 is a cross sectional view of an embodiment of the present invention.

In FIGS. 1–5, 7–8 and 12(A)–12(C), the pneumatic radial tires 1 according to the present invention are formed as a low aspect ratio passenger radial tire which has an aspect ratio H/W (tire section height H/tire maximum width W) of not more than 0.60. The tire 1 is mounted on a standard rim R and inflated to a regular inner pressure.

The tire 1 comprises a tread portion 2, a pair of sidewall portions 3 each extending radially inwardly from each edge of the tread portion 2, and a bead portion 4 positioned at the radially inner end of each of the sidewall portions 3.

The tire 1 further comprises a carcass 6 extending between the bead portions 4 and 4, and a stiff belt 7 disposed radially outside the carcass 6 and inside the tread portion 2.

The carcass comprises at least one ply of organic fiber cords 22, e.g. polyester fiber cords and the like.

The carcass cords 22 are arranged at an angle of 70 to 90 degrees with respect to the tire equator C and rubberized with a topping rubber 12.

Each of the bead portions 4 is provided with a bead core 5 and a bead apex 8.

The bead apex 8 is made of a hard rubber tapered radially outwardly from the bead core 5.

The JIS A hardness of the bead apex rubber is 80 to 95 degrees, and the complex elastic modulus E* thereof is preferably 300 to 600 kgf/sq.cm.

The height HB of the bead apex 8 from the bead base line BL is preferably not more than 0.50 times, for example 0.48 times, the tire section height H.

The belt 7 comprises at least two cross plies of parallel cords laid at a small angle of not more than 30 degrees with respect to the tire equator C. For the cross plies, high modulus cords, e.g. steel cords, aromatic polyamide fiber cords and the like, are used.

Preferably, the belt 7 consists of two cross plies 7A and 7B and a band 25 disposed radially outside the cross plies.

The band 25 is made of organic fiber cords, preferably nylon cords, laid substantially in parallel to the circumferential direction of the tire.

The band 25 comprises at least one wide ply 23 extending over the full width of the cross plies and disposed on the radially outside of the outer ply 7A. Further, the band 25 can include a pair of axially spaced narrow edge plies 24 disposed in the edge portions of the belt 7 as shown in FIG. 1.

Furthermore, the band 25 can include two wide plies, without narrow edge plies.

Figure 2:
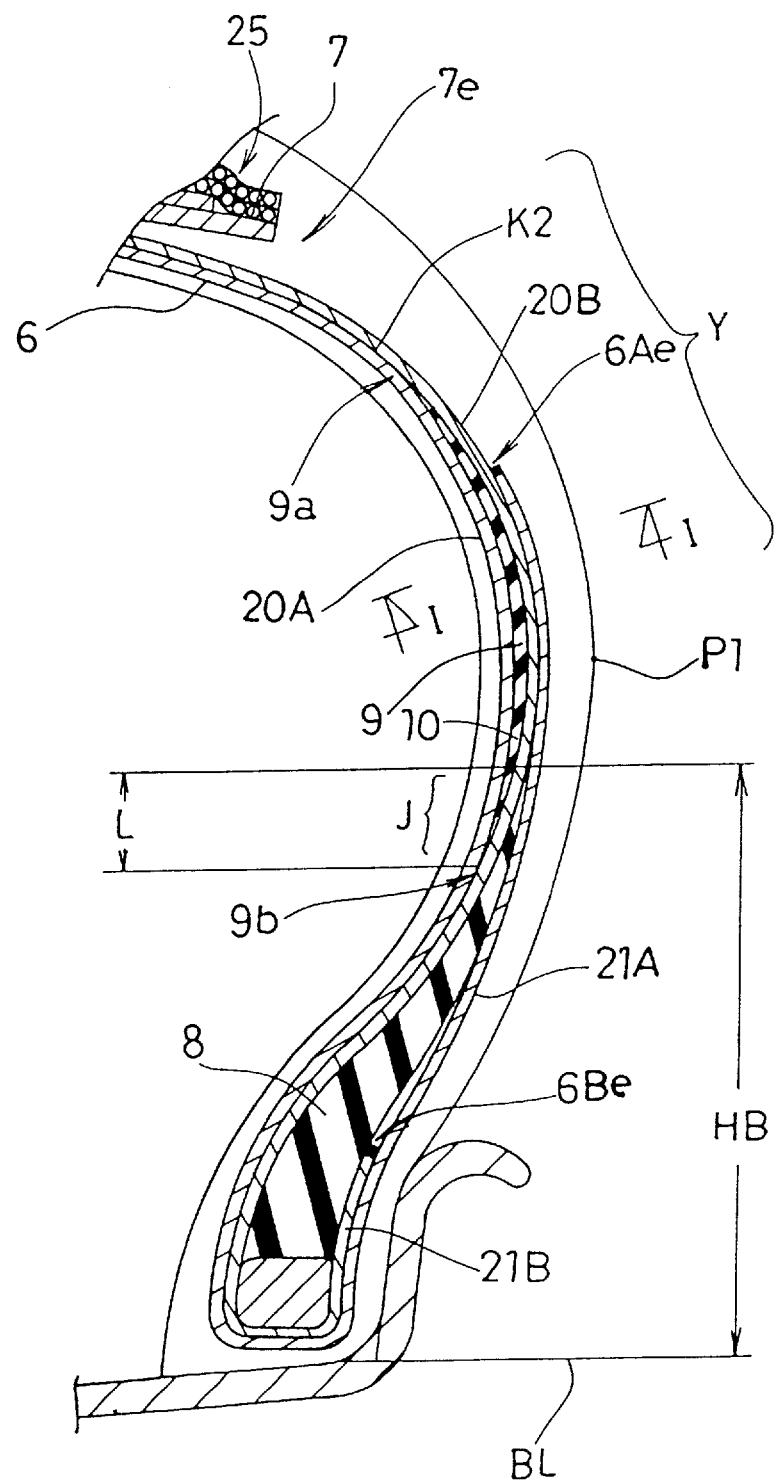
FIG. 2 is an enlarged cross sectional view of a bead portion and sidewall portion thereof.
Figure 3:
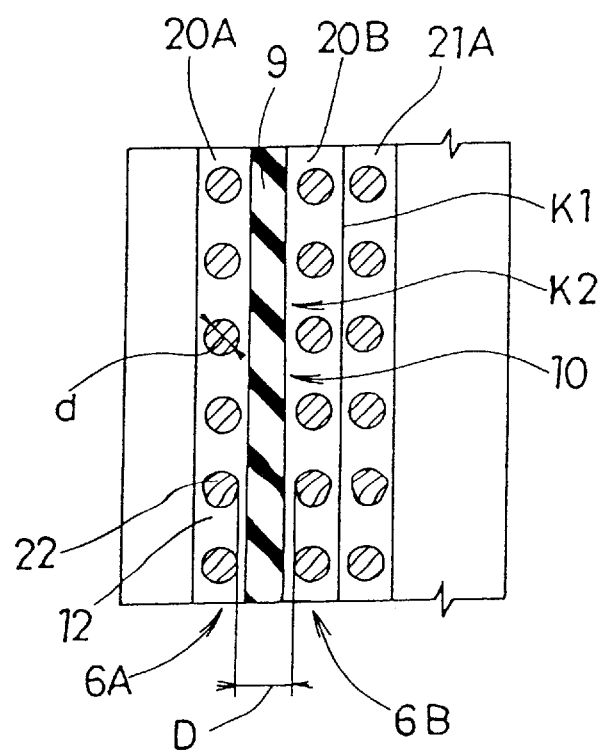
FIG. 3 is a cross sectional view taken along a line I—I of FIG. 1.

FIGS. 1–3 show the first embodiment in which the carcass 6 comprises a radially inner ply 6A and a radially outer ply 6B.

Each ply consists of a main portion 20 and a pair of turnup portions 21.

The main portion 20 extends between the bead cores 5 through the tread portion 2 and sidewall portions 3, and
each turnup portion 21 is turned up around each bead core 5 from the inside to outside of the tire.

Each carcass ply 6A and 6B is made of organic fiber cords 22, e.g. polyester fiber cords and the like, arranged at an angle of 70 to 90 degrees with respect to the tire equator C and rubberized with a topping rubber 12, as shown in FIG. 3.

The end 6Be of the turnup portion 21B of the outer carcass ply 6B is terminated at the axially outer side face of the bead apex 8 to avoid a concentration of bending stress.

The turnup portion 21A of the inner carcass ply 6A covers the above-mentioned edge 6Be of the turnup portion 21B.

The end 6Ae of the turnup portion 21A is terminated at a position radially outward of both the upper end of the bead apex 8 and the maximum tire width position P at which the tire width is maximum.

In this embodiment, the end 6Ae is located within the region Y defined between the maximum width position P and the axially outer edge 7e of the belt 7. However, the turnup portion 21A can be extended radially outwardly so that the end 6Ae thereof is secured between the belt 7 and the carcass ply main portion.

The upper end portion of the carcass ply turnup portion 21A outward of the upper end of the bead apex 8, abuts directly to the carcass ply main portion 20B. In this embodiment, a rubber spacer 9 is disposed between the two carcass ply main portions 20A and 20B so as to form a spaced portion 10.

The rubber spacer 9 is a seat of rubber. Preferably, the radially inner and outer edge portions thereof are tapered, and the remaining portion therebetween has a substantially constant thickness. However, the thickness may be increased gradually from the edges to the center thereof so that the central portion becomes thickest. In the former case, the width of the tapered portion is about 3 times the cord spacing D.

In the spaced portion 10, the mean cord spacing D between the carcass cords 22 in the carcass ply main portion 20A and the carcass cords 22 in the carcass ply main portion 20B is in the range of from 0.55 to 5.5 times the diameter (d) of the carcass cords 22. This spaced portion 10 increases the bending rigidity of this region Y, in which the bending deformation is largest, and steering performances can be improved without increasing the tire weight.

More preferably, the cord distance D is in the range of from 1.5 to 2.5 times (d).

In case of a passenger radial tire, the mean cord spacing D is usually 0.3 to 3.0 mm, more preferably 0.8 to 1.5 mm.

The mean cord spacing D is of a part of the rubber spacer 9 which part does not overlap with the belt 7 and bead apex 8.

In case of a constant thickness, over the entire width from the radially inner end to outer end, or
in case of the tapered edges, in the portion excepting the tapered edge portions,
the mean cord spacing D is preferably, 0.55 to 5.5 times, more preferably 1.5 to 2.5 times the cord diameter.

Test tires were made, varying the mean cord spacing D while keeping the cord diameter (d) at a constant value, and the tires were tested for steering performances and ride comfort.

The tire specifications were the same as Ex.1 of Table 1 except for the spacing D.

Figure 9:
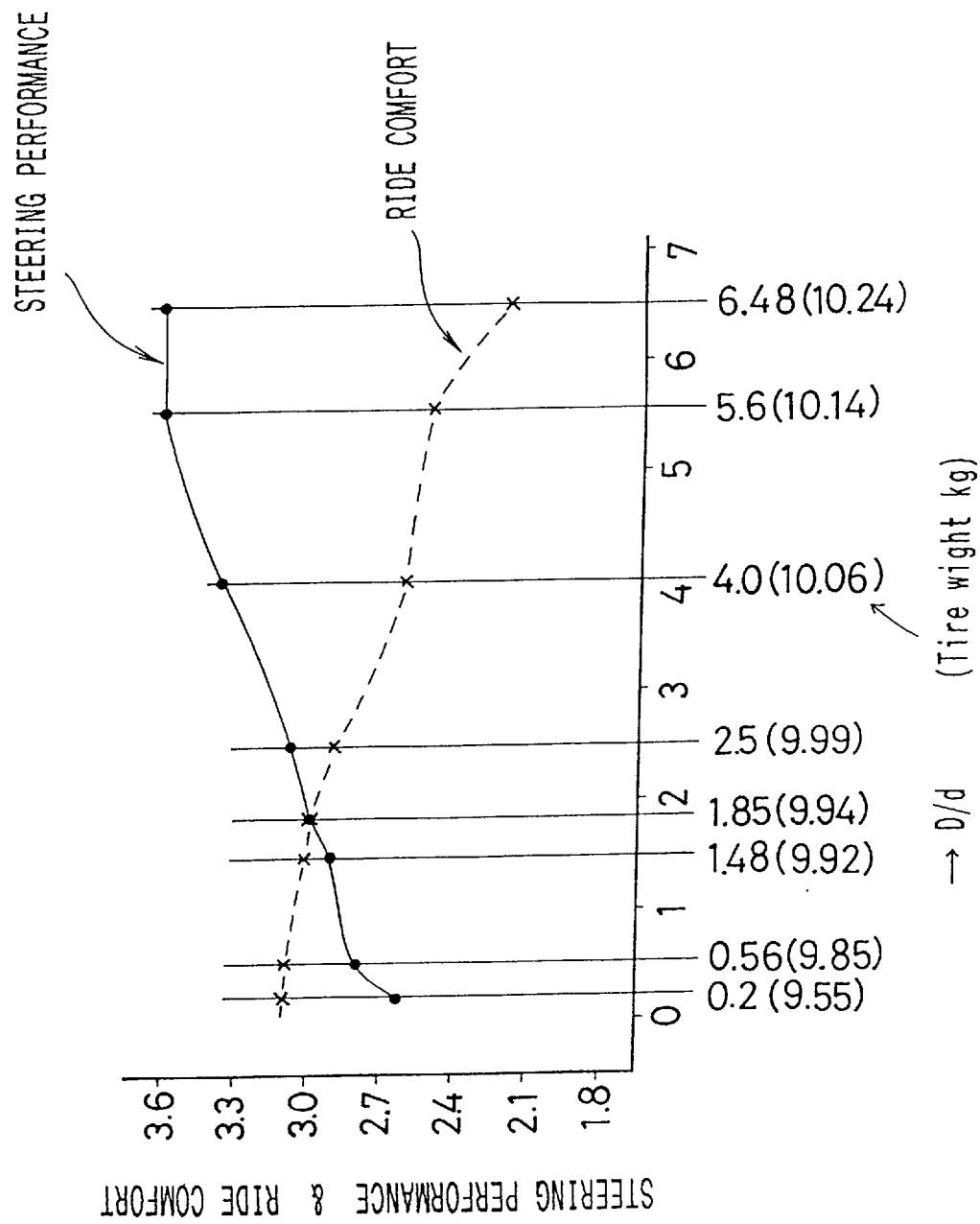
FIG. 9 is a graph showing a relationship between the D/d ratio and steering performance, and a relationship between the D/d ratio and ride comfort.

As shown in FIG. 9, from the test results, it was confirmed that, when the mean cord spacing D is increased, steering performances are improved, but the ride comfort is deteriorated. When the mean cord spacing D is in the range of 0.55 to 5.5 times the cord diameter (d), the steering performances and ride comfort become satisfactory, while preventing the tire weight from being increased.

If the mean cord spacing D is less than 0.55 times the cord diameter (d), the bending rigidity is not improved and accordingly steering performances can not be improved.

If D is more than 5.5 times (d), not only are the steering performances hardly improved, but also the ride comfort abruptly deteriorates. Further, the tire weight is excessively increased, and the tire uniformity is decreased.

In this embodiment, the upper end 9a of the rubber spacer 9 is spaced apart from the axially outer belt edge 7e, but it can overlap with the outer belt edge 7e.

Further, test tires were made, varying the abovementioned space Z and overlap Z' by changing the position for the upper end 9a of the rubber spacer 9 while keeping the tire section height H at a constant value, and the tires were tested for a ride comfort and steering performances.

The tire specifications were the same as Ex.1 of Table 1 except for the Z or Z'.

Figure 10:
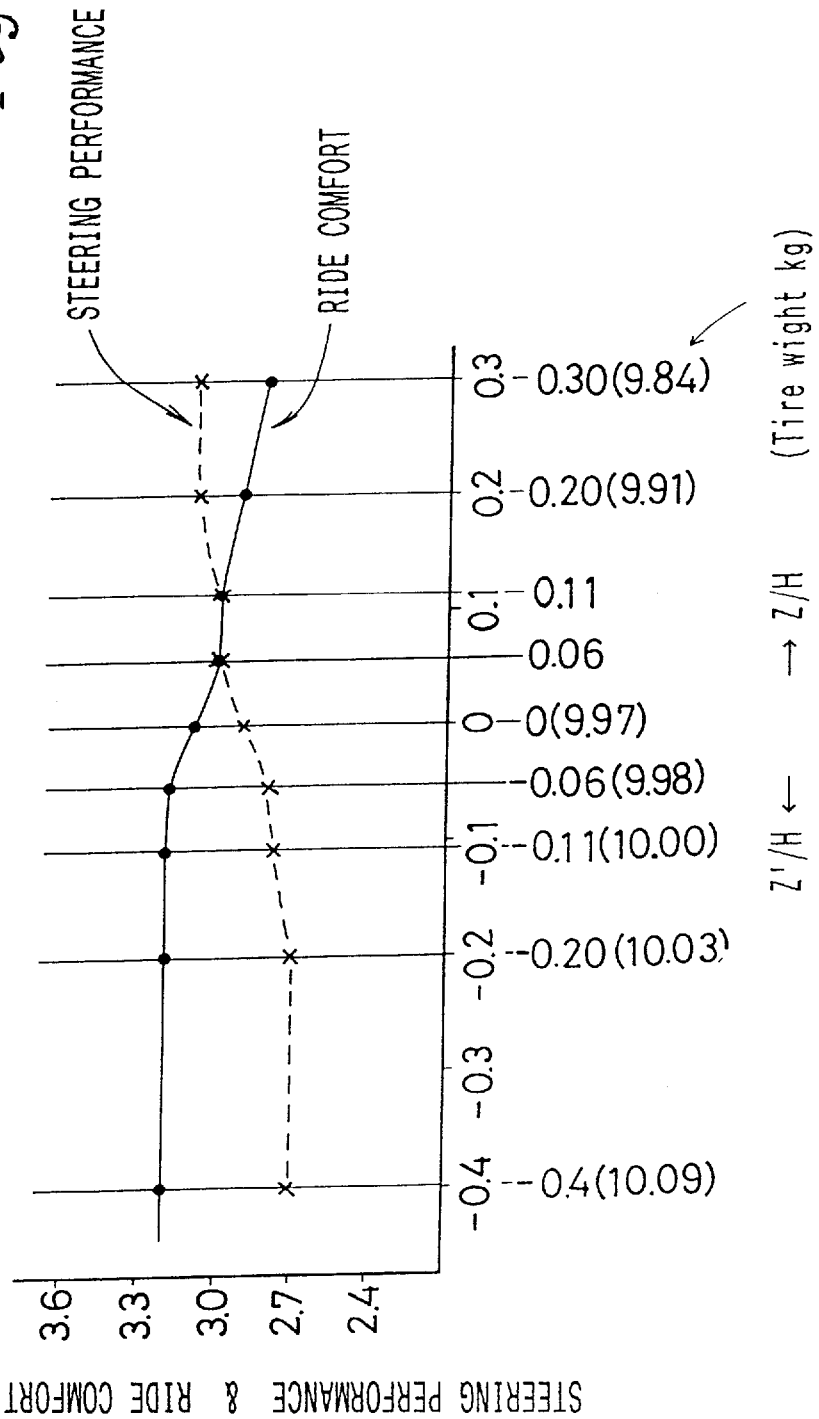
FIG. 10 is a graph showing a relationship between the ratio (Z/H or Z'/H) and steering performance and a relationship between the ratio (Z/H or Z'/H) and ride comfort.

The test results are shown in FIG. 10. From a point of view of ride comfort, it is preferable that the upper end 9a of the rubber spacer 9 does not overlap with the outer belt edge 7e, providing a space therebetween, as shown in FIG. 1.

The space Z is preferably 0.05 to 0.3 times, more preferably 0.05 to 0.2 times the tire section height H. If the space is less than 0.05 times H, deformation is apt to concentrate between the rubber spacer 9 and the outer belt edge 7e and the tire is liable to be damaged.

Even if the space exceeds 0.3 times H, more specifically 0.2 times H, a remarkable improvement in ride comfort can not be obtained.

Figure 12:
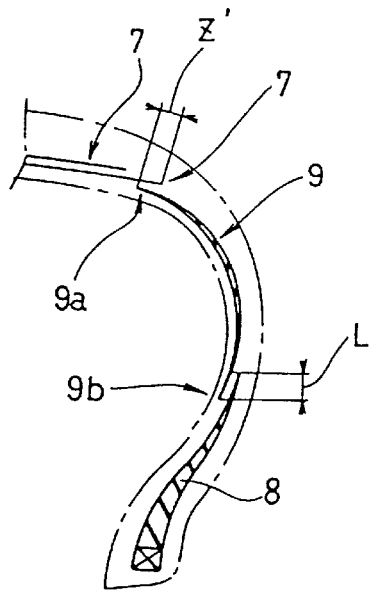
FIGS. 12(A) to 12(C) are schematic cross sectional views each showing another embodiment of the present invention.
Figure 12:
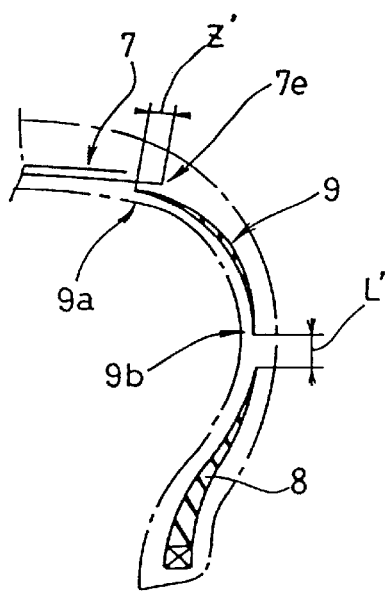
Figure 12:
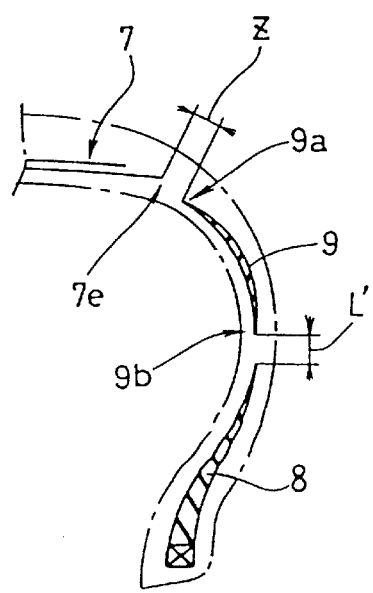

On the other hand, from a point of view of steering performances, it is preferable that the upper end 9a of the rubber spacer 9 overlaps with the outer belt edge 7e as shown in FIG. 12(A).

The overlap width Z' is preferably 0.05 to 0.4 times, more preferably 0.05 to 0.2 times the tire section height H.

If the width is less than 0.05 times H, deformation is apt to concentrate between the rubber spacer 9 and the outer belt edge 7e, and the tire is liable to be damaged.

Even if the width exceeds 0.4 times H, more specifically 0.2 times H, a remarkable improvement in steering performance can not be obtained, but the tire weight increases.

The test tires were further tested for the durability, using a drum. (tire load: 700 kg, tire inner pressure: 2.0 kgf/sq.cm, rim size: 16×7JJ, drum diameter: 0.9 m, running speed: 80 km/h, running distance: 50000 km)

In the tires wherein space Z=0 (Z'=0), a belt edge loosening was caused at a running distance of 42,000 km, and the tires became unusable. In the other tires, however, no damage occurred, and the test was completed.

The lower end 9b of the rubber spacer 9 is disposed radially inwards of the upper end of the bead apex 8, as shown in FIG. 1, so as to form an overlap portion J. However, as shown in FIG. 12(C), the lower end 9b can be spaced apart from the upper end of the bead apex 8.

Furthermore, test tires were made changing the position of the lower end 9b of the rubber spacer 9 while keeping the tire section height H at a constant value, and the tires were tested for steering performances and ride comfort.

The tire specifications were the same as Ex.1 of Table 1 except for the position of the lower end 9b.

Figure 11:
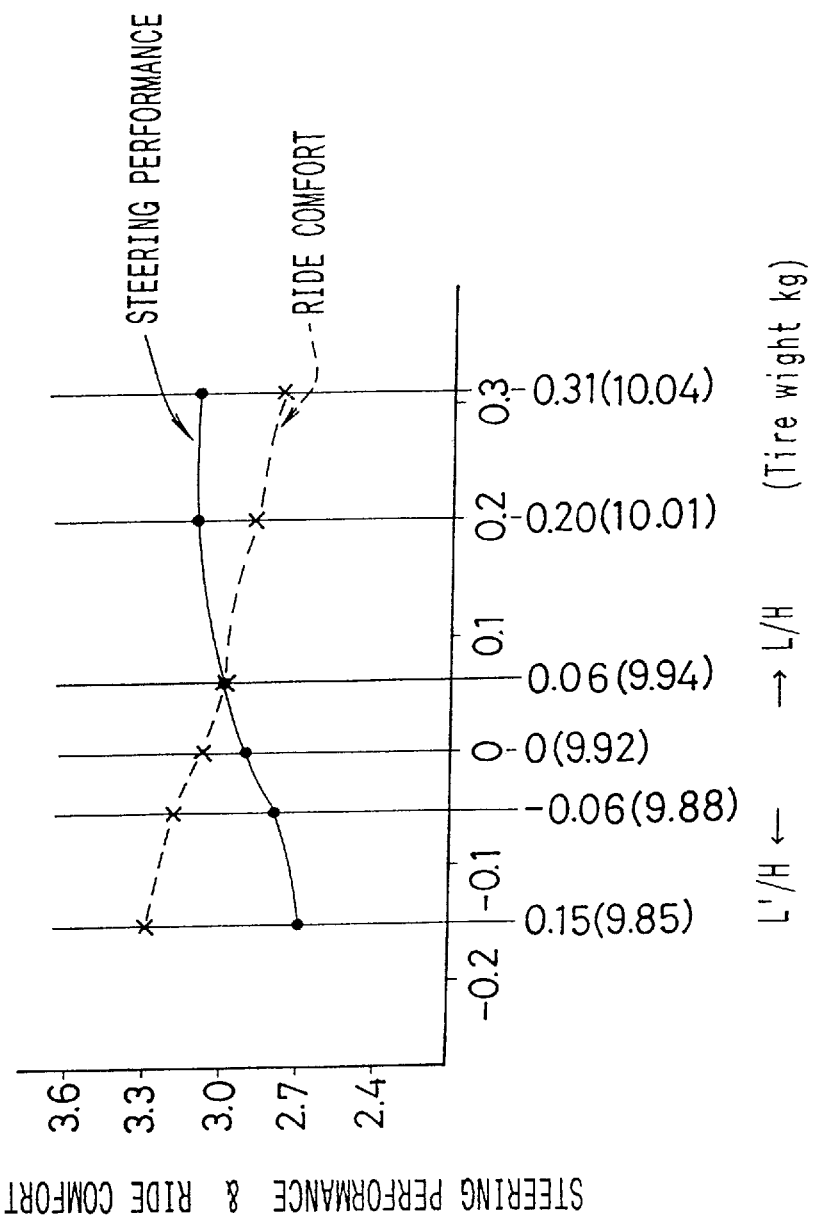
FIG. 11 is a graph showing a relationship between the ratio (L/H or L'/H). and steering performance and a relationship between the ratio (L/H or L'/H) and ride comfort.

The test results are shown in FIG. 11, wherein L is the width of the overlap of the rubber spacer 9 and bead apex, and L' is the space between the rubber spacer 9 and bead apex.

As apparent from FIG. 11, when the lower end 9b of the rubber spacer 9 overlaps with the bead apex 8, the lateral stiffness of the tire is further increased, and as a result, steering performances can be improved. The degree of improvement in the tire lateral stiffness is substantially proportional to the width L.

However, if the width L exceeds 0.2 times the tire section height H, steering performances are hardly improved, or rather the ride comfort deteriorates, and the tire weight increases.

If the width L is smaller than 0.05 times the tire section height H, deformation is apt to concentrate in the overlap portion, and the tire is liable to be damaged.

Accordingly, the width L of the overlap portion is preferable set in the range of from 0.05 to 0.2 times the tire section height H.

On the other hand, when a space is provided between the rubber spacer 9 and the bead apex, by setting the space L' not less than 0.05 times the tire section height H, the ride comfort can be improved, as shown in FIG. 11.

If the space L' is less than 0.05 times the tire section height H, the deformation is apt to concentrate in this spaced part, and the tire is liable to be damaged.

The test tires were further subjected to the above-mentioned durability drum test and a cut open inspection thereafter. As a result, in the tires wherein L=0 (L'=0), a ply separation was caused at the upper end of the bead apex 8.

Preferably, the rubber composition of the spacer 9 has a complex elastic modulus E* which is the same as or larger than that of the carcass ply topping rubber 12 but lower than that of the bead apex rubber, and a JIS A hardness which is lower than that of the bead apex rubber.

Figure 4:
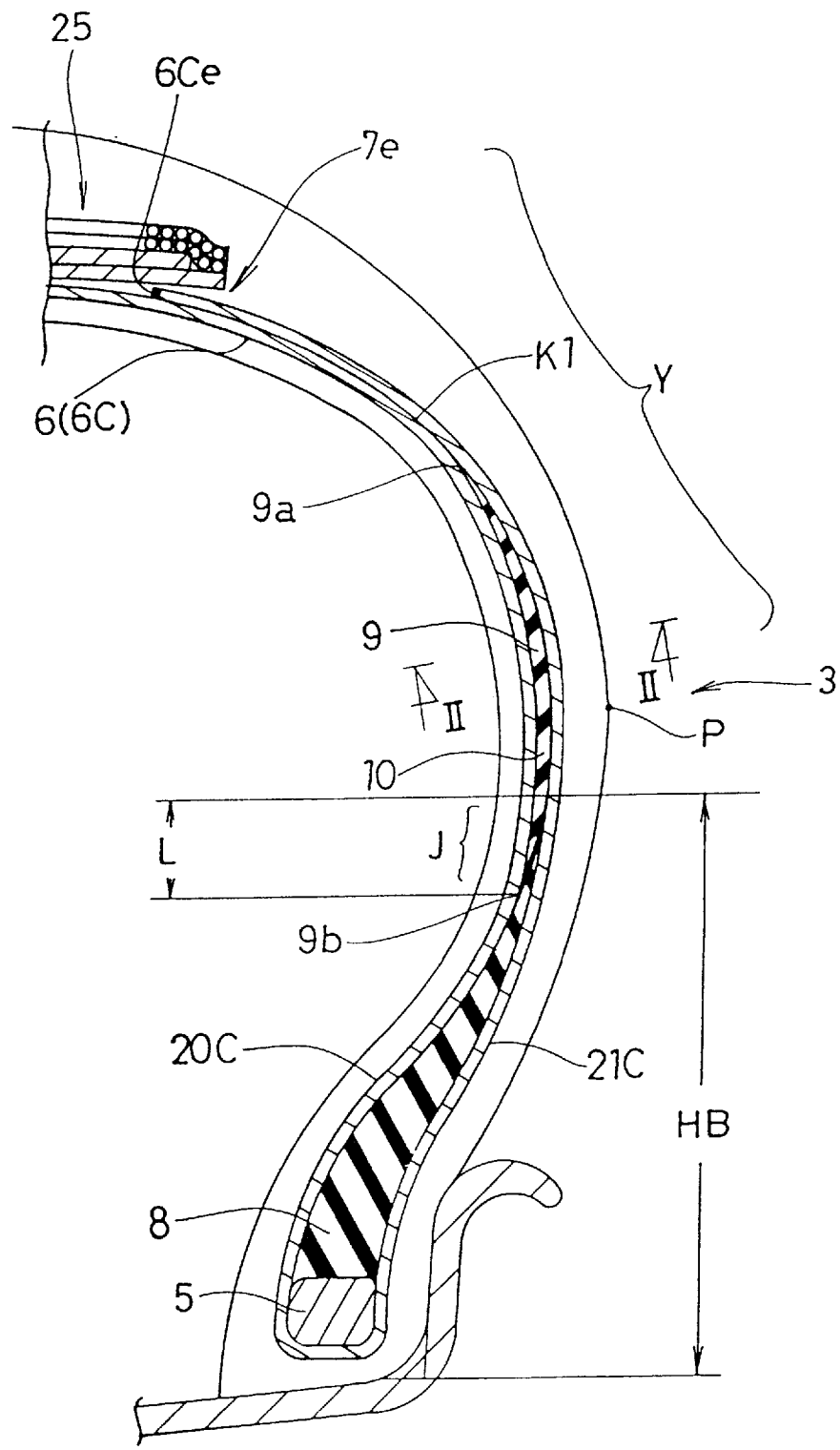
FIG. 4 is a cross sectional view of another embodiment of the the present invention.

FIG. 4 shows the second embodiment of the present invention, in which the tire 1 is provided with a carcass 6 consisting of a single carcass ply 6C.

The carcass ply 6C comprises a main portion 20C extending between the bead cores 5 through the tread portion and sidewall portions 3, and a pair of turnup portions 21C turned up around the bead cores 5 from the inside to outside of the tire.

The turnup portions 21C extend radially outwardly over the upper end of the bead apex 8 and maximum tire width position P.

The edge 6Ce thereof is terminated between the outer edge 7e of the belt 7 and the carcass ply main portion 20C to be secured therebetween.

As the upper part of the carcass ply turnup portion 21C extends over the upper end of the bead apex 8, this upper part and the carcass ply main portion 20C are adjacent each other.

Figure 5:
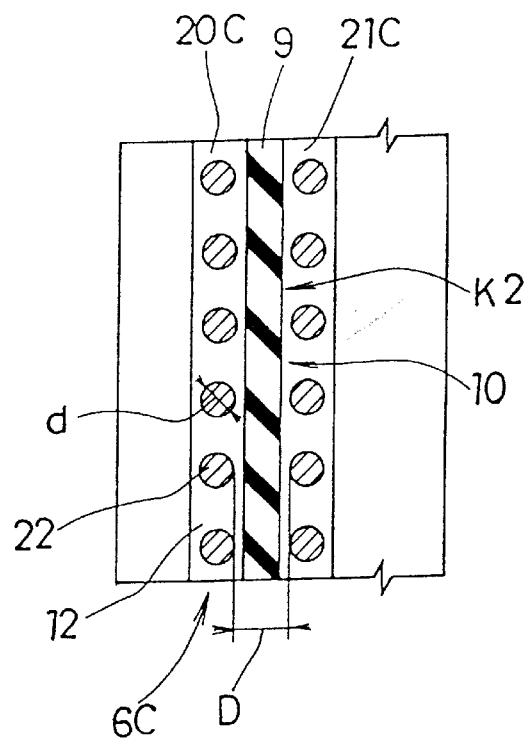
FIG. 5 is a cross sectional view taken along a line II—II of FIG. 4.
Figure 6:
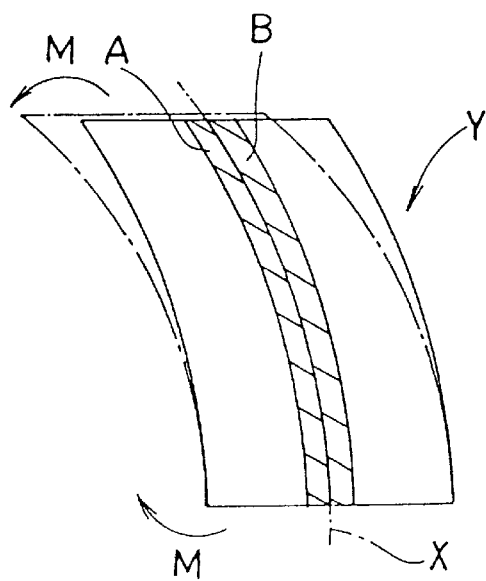
FIG. 6 is a schematic cross sectional view explaining the problem of a conventional carcass ply structure.
Figure 7:
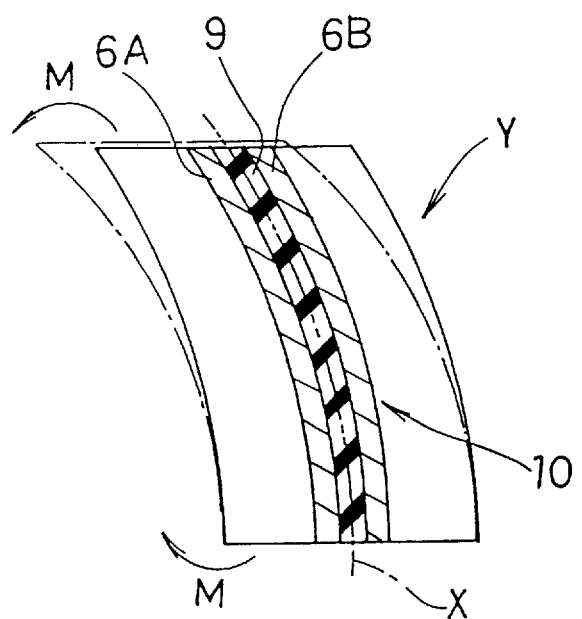
FIG. 7 is a schematic cross sectional view explaining the operation of the carcass ply structure according to the present invention.

In this embodiment, a rubber spacer 9 is disposed between the carcass ply main portion 20C and turnup portion 21C as shown in FIGS. 4 and 5 to form a spaced portion 10.

In this portion, the mean cord spacing D between the carcass cords in the carcass ply main portion 20C and the carcass cords 22 in the turnup portion 21C is set to be in the range of from 0.55 to 5.5 times the cord diameter (d).

The upper end 9a of the rubber spacer 9 is spaced apart from the belt edge 7e, but the lower end 9b overlaps with the bead apex 8.

As explained above, the width L of this overlap portion J is set in the range of from 0.05 to 0.20 times the tire section height H.

Figure 8:
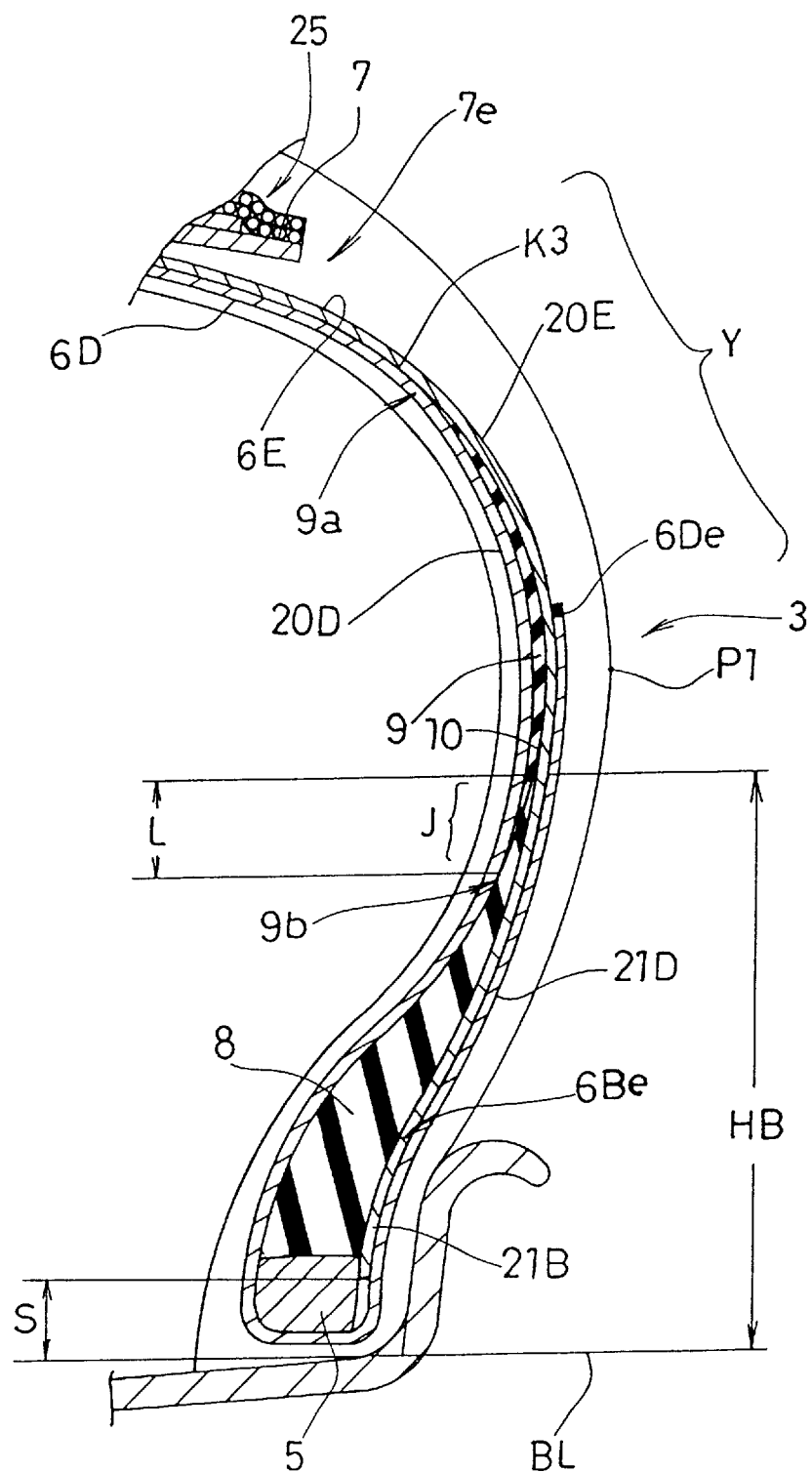
FIG. 8 is a cross sectional view of another embodiment of the the present invention.

FIG. 8 shows still another embodiment of the present invention in which the tire 1 is provided with a carcass 6 consisting of two carcass plies 6D and 6E.

The carcass ply 6D consists of a carcass ply main portion 20D extending between the bead cores 5 through the tread portion and sidewall portions 3, and a pair of turnup portions 21D turned up around the bead cores 5 from the inside to outside of the tire.

The turnup portion 21D of the carcass ply 6D extends radially outwardly over the upper end of the bead apex 8 and maximum tire width position P.

The edge 6De of the turnup portion 21D is spaced apart from the outer edge 7e of the belt 7 in the example shown in the figure, but they can be overlapped each other.

The carcass ply 6E consists of only a main portion 20E extending between the bead cores 5 through the tread portion and sidewall portions 3 and disposed axially outside of the carcass ply 6D.

The carcass ply 6E is terminated at a distance S from the bead base line BL.

The end thereof is located between the carcass ply main portion 20D of the carcass ply 6D and the bead apex 8, but the end can be located axially outward of the turnup portions 21D of the carcass ply 6D.

The carcass ply main portions 20D and the carcass ply main portions 20E are adjacent each other, and a rubber spacer 9 is disposed therebetween to form a spaced portion 10, similarly to the above-mentioned first and second embodiment.

In this portion, the mean cord spacing D between the carcass cords in the carcass ply main portion 20D and the carcass cords in the carcass ply main portion 20E is in the range of from 0.55 to 5.5 times the cord diameter (d).

The upper end 9a and lower end 9b of the rubber spacer 9 is constructed as explained above.

Passenger radial tires of 225/50R16 size having constructions shown in FIG. 1, 4 and 8 and FIG. 12(A) to 12(C) and specifications given in Table 1 were made and tested for steering performances and tire weight.

In the tire of FIG. 12(A), the rubber spacer 9 overlaps with both of the belt 7 and bead apex 8. In the tire of FIG. 12(B), the rubber spacer 9 overlaps only the belt 7. In the tire of FIG. 12(C), the rubber spacer 9 overlaps neither the belt 7 nor the bead apex 8.

The test results are shown in Table 1. The properties of the used rubber are shown in Table 2.

The steering performances: rigidity (response), response sharpness, response continuity, roll, and under steer, were evaluated into five ranks by the driver's feeling through an actual car test. The test tires were mounted in a 3000 cc passenger car. (Air pressure: 2.2 kg/sq.cm, Tire load : 360 kg) The larger the value, the better the performance.

From the test, it was confirmed that, with respect to every steering performance, the tires according to the present invention were the same or higher level than the reference tires.

Particularly, the Ex.1 tire having two carcass plies had a light weight and better performances in comparison with the Ref.2 tire having a single carcass ply.

The Ex.4 tire had good steering performances, the Ex.5 tire had good steering performances and a good ride comfort, and the Ex.6 tire had a good ride comfort.

As described above, the pneumatic radial tires of the present invention can be improved in steering performances while preventing the tire weight from increasing.

The present invention is suitably applied to a passenger car tire.

TABLE 1

Tire size: 225/50R16

|  | Ex. 1 | Ex. 2 | Ref. 1 | Ref. 2 | Ex. 3 | Ref. 3 | Ex. 4 | Ex. 5 | Ex. 6 |
|---|---|---|---|---|---|---|---|---|---|
| Tire height H (mm) | 112 | 112 | 112 | 112 | 112 | 112 | 112 | 112 | 112 |
| Bead apex height HB (mm) | 54 | 54 | 62 | 62 | 54 | 62 | 54 | 54 | 54 |
| Carcass |  |  |  |  |  |  |  |  |  |
| Ply number | 2 | 1 | 2 | 1 | 2 | 2 | 2 | 2 | 2 |
| Turnup structure | FIG. 1 | FIG. 4 | — | — | FIG. 8 | — | FIG. 1 | FIG. 1 | FIG. 1 |
| Turnup height |  |  |  |  |  |  |  |  |  |
| Inner ply (mm) | 70 | 96 | 70 | 96 | 70 | 70 | 70 | 70 | 70 |
| Outer ply (mm) | 20 | — | 20 | — | — | — | 20 | 20 | 20 |
| Hight S (mm) | — | — | — | — | 5 | 5 | — | — | — |
| Overlap L (mm) | 7 | 7 | — | — | 7 | — | 7 | — | — |
| Space L' (mm) | — | — | — | — | — | — | — | 7 | 7 |
| L/H | 0.06 | 0.06 | — | — | 0.06 | — | 0.06 | — | — |
| L'/H | — | — | — | — | — | — | — | 0.06 | 0.06 |
| Space Z (mm) | 12 | 12 | — | — | 12 | — | — | — | 12 |
| Overlap Z' (mm) | — | — | — | — | — | — | 12 | 12 | — |
| Z/H | 0.11 | 0.11 | — | — | 0.11 | — | — | — | 0.11 |
| Z'/H | — | — | — | — | — | — | 0.11 | 0.11 | — |
| Code material *1 | PE | PE/1 | PE | PE/1 | PE | PE | PE | PE | PE |
| Cord dia. d (mm) | 0.54 | 0.54 | 0.54 | 0.54 | 0.54 | 0.54 | 0.54 | 0.54 | 0.54 |
| Cord spacing D (mm) | 1.0 | 1.0 | 0.2 | 0.2 | 1.0 | 0.2 | 1.0 | 1.0 | 1.0 |
| D/d | 1.85 | 1.85 | — | — | 1.85 | — | 1.85 | 1.85 | 1.85 |
| Test result |  |  |  |  |  |  |  |  |  |
| Tire weight (kg) | 9.94 | 9.56 | 10.17 | 9.97 | 9.82 | 10.02 | 10.03 | 9.98 | 9.88 |
| Ride comfort | 3 | 3 | 3.2 | 3.3 | 2.8 | 3 | 2.8 | 2.9 | 3.2 |
| Steering Performances |  |  |  |  |  |  |  |  |  |
| Rigidity/Response | 3 | 3 | 2.5 | 3 | 3.5 | 3 | 3.5 | 3 | 2.5 |
| Response sharpness | 3 | 3 | 2.5 | 2.5 | 3.5 | 3 | 3.5 | 3 | 2.5 |
| Response continuity | 3 | 3 | 2.5 | 2.5 | 3.5 | 3 | 3 | 3 | 3.0 |
| Roll | 3 | 3 | 3 | 3 | 4 | 3.5 | 3 | 3 | 3.0 |
| Under steer | 3 | 3 | 2.5 | 2.5 | 4 | 3.5 | 3 | 3 | 3 |

*1 PE: polyester

TABLE 2

|  | Complex elastic modulus E* (kgf/sq.cm) | JIS A hardness (degree) |
|---|---|---|
| Carcass topping rubber | 48 | 60 |
| Rubber spacer | 48 | 60 |
| Bead apex | 550 | 92 |

We claim:

1. A pneumatic radial tire comprising: a tread portion, a pair of sidewall portions, a pair of bead portions each with a bead core therein, a carcass extending between the bead portions, said carcass consisting of one ply of cords, said one ply extending between the bead portions and turned up around the bead cores from the inside to outside of the tire to form a pair of turnup portions and a main portion therebetween, and a belt disposed radially outside the carcass and having a pair of edges, a rubber bead apex disposed in each bead portion and extending radially outwardly from the bead core, and a rubber spacer disposed between the main portion and each of the turnup portions in each of said sidewall portions between an edge of said belt and the maximum tire width position so that the cord spacing between the cords of the main portion and each of the turnup portions is in the range of from 0.55 to 5.5 times the diameter of the cords, wherein the radially outer end of the rubber spacer is spaced apart from the axially outer edge of the belt, and the space therebetween is 0.05 to 0.3 times the section height of the tire.

2. A pneumatic radial tire which comprises:

a tread portion, a pair of sidewall portions, a pair of bead portions each with a bead core therein, a carcass extending between the bead portions, said carcass consisting of one ply of cords, said one ply extending between the bead portions and turned up around the bead cores from the inside to outside of the tire to form a pair of turnup portions and a main portion therebetween, and a belt disposed radially outside the carcass and having a pair of edges, a rubber bead apex disposed in each bead portion and extending radially outwardly from the bead core, and a rubber spacer being disposed between the main portion and each of the turnup portions in each of said sidewall portions between an edge of said belt and the maximum tire width position so that the cord spacing between the cords of the main portion and each of the turnup portions is in the range of from 0.55 to 5.5 times the diameter of the cords, whereby the radially inner end of the rubber spacer overlaps with the radially outer end of the bead apex, with the overlap width being 0.05 to 0.2 times the section height of the tire.

3. A pneumatic radial tire comprising:

a tread portion, a pair of sidewall portions, a pair of bead portions each with a bead core therein, a carcass extending between the bead portions, said carcass consisting of one ply of cords, said one ply extending between the bead portions and turned up around the bead cores from the inside to outside of the tire to form a pair of turnup portions and a main portion therebetween, and a belt disposed radially outside the carcass and having a pair of edges, a rubber bead apex disposed in each bead portion and extending radially outwardly from the bead core, and a rubber spacer disposed between the main portion and each of the turnup portions in each of said sidewall portions between an edge of said belt and the maximum tire width position so that the cord spacing between the cords of the main portion and each of the turnup portions is in the range of from 0.55 to 5.5 times the diameter of the cords, wherein the radially inner end of the rubber spacer overlaps with the radially outer end of the bead apex, the overlap width is 0.05 to 0.2 times the section height of the tire, and the rubber spacer has a complex elastic modulus $E^*$ which is lower than that of the bead apex rubber, and a JIS A hardness which is lower than that of the bead apex rubber.

* * * * *